United States Patent
Pettersson et al.

(10) Patent No.: US 7,175,095 B2
(45) Date of Patent: Feb. 13, 2007

(54) CODING PATTERN

(75) Inventors: Mats Petter Pettersson, Lund (SE); Petter Ericson, Malmö (SE)

(73) Assignee: Anoto AB, Lund (SE)

( * ) Notice: Subject to any disclaimer, the term of this patent is extended or adjusted under 35 U.S.C. 154(b) by 21 days.

(21) Appl. No.: 10/242,358

(22) Filed: Sep. 13, 2002

(65) Prior Publication Data
US 2003/0066896 A1    Apr. 10, 2003

Related U.S. Application Data

(60) Provisional application No. 60/323,694, filed on Sep. 21, 2001.

(30) Foreign Application Priority Data
Sep. 13, 2001    (SE)    .................................... 0103029

(51) Int. Cl.
G06K 19/06    (2006.01)

(52) U.S. Cl. ...................................... 235/494; 235/454

(58) Field of Classification Search ................ 235/494, 235/487, 454
See application file for complete search history.

(56) References Cited

U.S. PATENT DOCUMENTS

| | | | |
|---|---|---|---|
| 5,168,147 A | 12/1992 | Bloomberg | |
| 5,194,852 A * | 3/1993 | More et al. | 345/182 |
| 5,221,833 A * | 6/1993 | Hecht | 235/494 |
| 5,245,165 A | 9/1993 | Zhang | |
| 5,477,012 A | 12/1995 | Sekendur | |
| 5,515,456 A * | 5/1996 | Ballard | 382/252 |
| 5,652,412 A * | 7/1997 | Lazzouni et al. | 178/18.01 |
| 5,900,943 A | 5/1999 | Owen | |
| 5,913,105 A * | 6/1999 | McIntyre et al. | 438/16 |
| 5,937,110 A | 8/1999 | Petrie et al. | |
| 6,000,613 A | 12/1999 | Hecht et al. | |
| 6,076,734 A * | 6/2000 | Dougherty et al. | 235/462.01 |
| 6,081,261 A * | 6/2000 | Wolff et al. | 345/179 |
| 6,208,771 B1 | 3/2001 | Jared et al. | |
| 6,586,688 B2 | 7/2003 | Wiebe | |
| 6,627,870 B1 * | 9/2003 | Lapstun et al. | 250/221 |

FOREIGN PATENT DOCUMENTS

| | | |
|---|---|---|
| EP | 0 984 390 A2 | 9/2000 |
| JP | 10-257309 | 9/1998 |
| WO | WO 01/26032 A1 | 4/2001 |
| WO | WO 01/26033 A1 | 4/2001 |
| WO | WO 01/41055 A1 | 6/2001 |
| WO | WO 01/48685 A1 | 7/2001 |
| WO | WO 03/107265 A1 | 12/2003 |

* cited by examiner

Primary Examiner—Daniel Stcyr
(74) Attorney, Agent, or Firm—Birch, Stewart, Kolasch & Birch, LLP (57) ABSTRACT

A product is provided with a coding pattern, which codes position information in the form of coordinates for a plurality of points on the product with the aid of a plurality of marks belonging to each point. The marks have a first parameter which varies for coding of the position information. The marks additionally have a second parameter which varies for coding of further information in the coding pattern. A method and a device for coding of the coding pattern and a method and a device for decoding of the coding pattern are also described.

42 Claims, 4 Drawing Sheets

CODING PATTERN

This application claims priority on provisional Application No. 60/323,694 filed on Sep. 21, 2001, the entire contents of which are hereby incorporated by reference.

FIELD OF THE INVENTION

The present invention relates to a product which is provided with a coding pattern, which codes position information in the form of coordinates for a plurality of points on the product with the aid of a plurality of marks belonging to each point, which marks have a first parameter which varies for coding of the position information.

The invention also relates to a method and a device for coding of a coding pattern and to a method and a device for decoding of a coding pattern.

BACKGROUND OF THE INVENTION

It is already known that it is possible to digitize handwriting by determining how a pen used to create the handwriting is moved. One way of doing this is to use a base for the handwriting provided with a position-coding pattern which codes coordinates for points on the base, and also to provide the pen with a sensor which records the position-coding pattern locally at the tip of the pen as the pen is moved across the base. A processing unit, which can be placed in the pen or at a distance therefrom, can then decode the recorded position-coding pattern so that the movement of the pen across the base can be determined as a series of coordinates.

WO 01/26032, which is assigned to the applicant of the present application, describes a position-coding pattern which can be used precisely for digitizing handwriting. The pattern is made up of marks, which for example can be in the form of dots. Each dot has a nominal position represented by an intersection between two lines in a virtual raster, for example a square grid. Each dot codes a fixed value depending on its location in relation to the nominal position. The dots can have four possible locations, for example, one on each of the four raster lines extending from the intersection, the four different locations coding four different values. The coordinates of a point are coded with the aid of a plurality of dots, for example 6×6 dots. However, each dot contributes to the coding of the coordinates of a plurality of points. If a sensor first reads 6×6 dots and is thereafter moved one dot distance to the side or vertically, the sensor will read dots which code the coordinates of a new point. This type of pattern in which an arbitrary partial surface of predetermined size defines a position is in the present application referred to as "floating".

Using the pattern in the above-mentioned WO 01/26032, coordinates for a very large number of points can be coded, theoretically $4^{36}$ points if each point is coded with 6×6 dots. All these points can be said to form an imaginary surface. WO 01/48685, which is also assigned to the applicant of the present invention, describes how such an imaginary surface can be used for information management. More specifically, different partial areas on the imaginary surface are dedicated to different types of information management. It is then possible to control how information which is recorded digitally is to be handled by providing bases with a position-coding pattern which corresponds to different partial areas on the imaginary surface. For example, a first base can be provided with a position-coding pattern which means that information which is written on the position-coding pattern and is recorded digitally by the pen is sent to a predetermined computer for storage in the latter. Correspondingly, another base can be provided with a position-coding pattern which means that information which is recorded digitally with the aid of this position-coding pattern is sent as an e-mail to an address indicated by the user on the base.

It will be evident from the above that it would be useful for the total position-coding pattern to be able to code coordinates for as large a number of points as possible. This applies not only to the position-coding pattern described above, but to all coding patterns which can be used for information management. Examples of other coding patterns are to be found in U.S. Pat. No. 5,168,147, U.S. Pat. No. 5,245,165 and U.S. Pat. No. 5,477,012.

One possible way of coding coordinates for more points would be to increase the number of values which each mark can code. In the above example, each dot could therefore be allowed to have more than four different possible locations for coding more than four different values. However, the greater the number of different locations allowed, the more difficult it becomes to decode the pattern in a correct manner.

WO 01/48685 also describes how the pen which records the position-coding pattern can store different digital templates which define how the information on the physical base with a position-coding pattern is to be interpreted. An e-mail template can, for example, specify that a base with a corresponding position-coding pattern has a first field which is intended for a message, a second field which is intended for an e-mail address to be interpreted by ICR (Intelligent Character Recognition), and a third field which constitutes a "send" box which the user ticks in order to initiate the forwarding of recorded information.

Different bases can have fields with different functions. The number of fields can be different on different bases. They may also be differently located on the bases, that moreover may have different sizes.

As is also described in WO 01/48685, the position-coding pattern can be arranged differently on the physical base. According to a first alternative, the position-coding pattern on the base can be continuous, which means that it corresponds to a continuous area of the imaginary surface. The unit which is to interpret and process the digital information recorded from the base must then know the layout of the base, i.e. which fields there are on the base and where these are located. If many different layouts are allowed, which is of course desirable, a large amount of information has to be stored so that it is available to the unit which is to process the information. This is particularly a problem if the processing unit has a limited storage capacity and/or if it takes a long time to change the information once it has in fact been stored. This may be the case, for example, if the processing unit consists of a portable user unit, such as the pen in WO 01/48685.

According to a second alternative, the position-coding pattern on the base can correspond to a combination of a plurality of separate partial areas on the imaginary surface so that the position-coding pattern is discontinuous. For example, the position-coding pattern in the first field can then correspond to a first partial area on the imaginary surface which is dedicated to message information, the position-coding pattern in the second field can correspond to a second partial area which is dedicated to address information which is to be processed by ICR, and the position-coding pattern in the third field can correspond to a partial area which is dedicated to "send" boxes. In this case, the location of fields on the base is therefore not related to the location of corresponding partial areas on the imaginary surface. In this alternative, the unit which is to interpret and process the digital information from the base has to store a smaller quantity of information because it only needs to know the coordinates of the different partial areas on the imaginary surface.

In certain situations, however, the continuous position-coding pattern is still to be preferred. If the pattern is of the floating type, positions will not be able to be defined in a boundary area between two different fields in the discontinuous position-coding pattern since the dots in the boundary area do not code coordinates for adjacent points on the imaginary surface. One way of solving this problem is to have no position-coding pattern in the boundary area so that points belonging to one or other field can be detected unambiguously. Such boundary areas without position-coding pattern can be undesirable, especially when the product is small. It would therefore be advantageous to be able to use templates with a continuous position-coding pattern and without the unit intended to process the information having to store the specific template for every conceivable layout on the physical base. This is particularly desirable when different parties are to be allowed themselves to produce bases with different layouts at the same time as the digital information which is recorded from these bases is to be able to be processed in one or more central units whose template databases cannot be updated every time a party wishes to use a new and not previously defined layout, or in user units with limited storage capacity and where it is difficult to updated the template database after manufacture when the user has received the user unit.

SUMMARY OF THE INVENTION

An object of the present invention is therefore to wholly or partially solve the above-mentioned problems.

This object is achieved with the aid of a product according to claim 1, a method for coding according to claim 16, a device for coding according to claim 26, a method for decoding according to claim 27, a device for decoding according to claim 35, a product according to claim 36 and a product according to claim 37.

According to a first aspect, the invention thus relates to a product which is provided with a coding pattern, which codes position information in the form of coordinates for a plurality of points on the product with the aid of a plurality of marks belonging to each point, the marks having a first parameter which varies for coding of the position information. The marks also have a second parameter which varies for coding of further information in the coding pattern.

Instead of coding further information in the coding pattern with the aid of the same parameters, such as the location in the example mentioned by way of introduction, another parameter is therefore used, such as color or size, for coding the further information. The further information is then more easily detectable with a sensor, since the information is now coded in two different "dimensions". The risk of incorrect detections is thereby reduced.

Another advantage of coding the further information with the aid of a second parameter is that the position information is unaffected by the further information. Thus, this new coding pattern is compatible with an old position-coding pattern which does not code further information by a second parameter. This in turn means that a user unit adapted to decode the old coding pattern is able to decode the position information in the new coding pattern, and that a new user unit adapted to decode the new coding pattern is able to decode the position information in the old position-coding pattern.

Still another advantage is that the number of positions codeable by the coding pattern remains the same despite the inclusion in the coding pattern of the further information.

The use of a second parameter for coding further information may be particularly suited for "floating" coding pattern.

The marks can be optically detectable, and the first parameter and the second parameter can thus also be optically detectable. The parameters can typically relate to shape, color, gray scale, size, angle position, location and/or degree of filling of the marks. The coding pattern can be of the type mentioned by way of introduction and described in WO 01/26032, but the principles of the invention are also applicable to other position-coding patterns which are made up of a plurality of discrete marks, each of which can code at least two different values.

The second parameter can be detectable independently of the first parameter so that the detection of the second parameter does not affect the detection of the first parameter. The parameters may in other words be orthogonal to each other. The first parameter and the second parameter can be one of the following pairs: location and size; location and color; size and location; size and shape; size and color; shape and location; shape and color; shape and size; color and location; color and size; and color and shape. A preferred combination is location and size, since these parameters are comparatively easy to detect.

The further information can be further position information, the variation in the second parameter making it possible to code at least two further values for each mark. In the case set out by way of introduction, where a mark codes four different values with the aid of four different locations, it would be possible, by varying a second parameter of the mark between two different values, for example the "size" parameter between the values of "small" and "large", to code eight different values for each mark, which would thus permit coding of coordinates for $8^{36}$ points in the earlier example where each point was coded with 6×6 marks.

The further information can alternatively be information other than position information, and it can in this case from a second inforamtion layer, the position inforamtion constituting the first information layer. The second information layer can, for example, contain height inforamtion related to positions on a map which is coded with the position information.

It is also conceivable to code further information in the second information layer with very high redundancy so that when a certain amount of position information has been digitally recorded with the aid of the coding pattern, it is very highly probable that the further inforamtion in the second information layer has also been recorded. The further information could, for example, be an address to which the information digitally recorded with the aid of the coding pattern is to be sent.

The second parameter can furthermore be used for marking out an area of the coding pattern, so that a user unit can recognize that coordinates recorded with the aid of the coding pattern originate from the area without having to utilize a template. In this way, new page layouts can be created without new templates having to be created The area can be an area having an associated predetermined function. Hence, it can be designated as a functional area. The function associated with the area can be defined in the processing unit which processes the information recorded with the aid of the coding pattern. The function may for instance be to send the information recorded from different parts of the coding pattern to an address, to perform character-recognition on the information recorded from the marked-out area, to provide a feed-back to the user or to interpret the information recorded from the area as a specific type of information.

Phrased in other words, the further inforamtion can be used in order to define at least two different areas or fields on the coding pattern. The areas can be defined by the second parameter being given a value in one area and another value in the other area. This possibility of defining areas in the coding pattern, so that it is possible to tell from the digitally recorded information which area the information is associated with, can be used to reduce the initially stated problem of storage of template information. A party wishing to produce a new layout, for example with an address field at the top of a page instead of at the bottom of a page, would, with the aid of the second parameter, be able to define an address field at the top of a page with a continuous position-coding pattern. This of course presupposes that in the unit which is to interpret the digitally recorded information it has been defined that information with a certain value of the second parameter is to be interpreted as address information. The technique of using the second parameter to depict digitally detectable areas on the position-coding pattern affords the same advantages as regards the need for information storage as the use of templates with a discontinuous position-coding pattern.

The further information can alternatively define whether a predetermined area in the coding pattern is activated or not. A template can then include a plurality of areas with the same function located at different places, for example a plurality of address fields or a plurality of "send" boxes. A party wishing to use the template can then use the second parameter to code further information in the coding pattern, which further information indicates whether corresponding points belong to an activated area or not. The unit which is intended to process the recorded information then knows for example if coordinates which have been recorded from a "send" box area are to be interpreted as a "send" instruction or, if the current "send" box is not activated, as anther type of pre-defined information.

As has been explained above, the further information can define how coordinates which are recorded from said at least two different areas are to be processed. The invention could therefore be described as a product with a coding pattern which codes coordinates for a plurality of points on the product through variation of a first parameter of a plurality of marks belonging to each point; which coding pattern is intended for digital recording of information which is written on the coding pattern; and which coding pattern comprises at least a first area and a second area; said information which is recorded digitally being intended to be processed in different ways depending on from which of said areas the inforamtion is recorded, and the first area and the second area being coded in the coding pattern through variation of a second parameter of the marks.

The coding pattern can also be divided into a plurality of cells, each of these comprising at least two marks, the further inforamtion consisting of a cell value which is coded by said at least two marks for each cell. In this way, several different types of areas can be coded with the aid of the second parameter. If, for example, the coding pattern is divided into cells of two marks and each mark can have two different values for the second parameter, up to four different types of areas can be coded with different cell values.

The cells can comprise fewer marks than the plurality of marks, belonging to each point, required for coding of the coordinates for a point. If the further inforamtion is used, for example, to define areas, a smaller number of cell values is needed. The cells can then be made fairly small, so that the marks which define coordinates for a point define several cells. In this way, the coding is made more robust and incorrect decoding is discovered more easily.

In order to further increase the robustness of the coding, each mark can have at least two predetermined values for the second parameter and each cell can comprise at least one mark with each of the predetermined values. Since in this case there is always a mark with each possible value, the marks can be compared with each other on decoding. In this way it is easier, on decoding, to establish the value for a mark which has become distorted during the recording.

If a first area and a second area on a coding pattern are defined with different values of the second parameter for the marks or with different cell values, problems may arise in a boundary area between the first area and the second area. If the tip of the pen, which the user writes with on the base, and the sensor which records the position-coding pattern are offset from one another, this can in fact mean that the user is writing with the tip of the pen in the first area, but the sensor is recording the coding pattern in the second area, or vice versa. One way of at least partially solving this problem is to have the boundary area comprise cells with the first cell value and cells with the second cell value, i.e. a mixture of cells with different cell values. The mixture can indicate to the unit for processing the information that the recording of digital information is effected in a boundary area, in which case the processing unit can use information which has been recorded immediately before and/or immediately after in order to decide if the current information is to be interpreted as belonging to one area or the other.

According to a second aspect, the invention relates to a method in a coding device for producing a coding pattern which codes position information in the form of coordinates for a plurality of points with the aid of a plurality of marks belonging to each point, comprising allocating, for the coding of the position information, to each mark in a digital representation of the marks in the coding pattern one of at least two predetermined values for a first parameter, and allocating to each mark one of at least two predetermined values for a second parameter for coding of further information in the coding pattern.

The method can be implemented with the aid of a computer program which can be stored in a memory in the coding device or in some other unit from which it can be made available to the coding device.

According to a third aspect, the invention relates to a device for coding of a coding pattern, which codes position information in the form of coordinates for a plurality of points on a surface with the aid of a plurality of marks belonging to each point, which device comprises processing means for determining a value for a first parameter and a value for a second parameter for each mark, and a memory for storing the values of the marks for the first parameter and the second parameter.

The coding device can, for example, be a suitably programmed computer, in which case the processing means is a processor, or specially adapted hardware of some type, where the processing means is realized for example with an ASIC (Application-Specific Integrated Circuit) or an FPGA (Field-Programmable Gate Array) or with some arrangement of digital and/or analog circuits.

According to a fourth aspect, the invention relates to a method for decoding, in a decoding device, of a coding pattern which codes position information in the form of coordinates for a plurality of points on a product with the aid of a plurality of marks belonging to each point, comprising the receiving a digital representation of the coding pattern, decoding the position information with the aid of the value for the first parameter for at least some of the marks in the digital representation, and decoding further information from the coding pattern on the basis of the value for a second parameter for at least some of the marks in the digital representation.

The method can be implemented with the aid of a computer program which can be stored for example in a memory in the decoding device or in some other unit from which it can be made available to the decoding device.

According to a fifth aspect, the invention relates to a device for decoding of a coding pattern which codes position information in the form of coordinates for a plurality of points on a product with the aid of a plurality of marks belonging to each point, which device comprises processing means which are arranged to receive a digital representation of the coding pattern, to decode the position information with the aid of the value for the first parameter for at least some of the marks in the digital representation. The processing means are also arranged to decode further information from the coding pattern on the basis of the value for a second parameter for at least some of the marks in the digital representation.

The decoding device can be, for example, a computer-based unit, in which case the processing means consist of a suitably programmed processor, or specially adapted hardware of some type, where the processing means are realized with for example an ASIC or an FPGA or with some arrangement of digital and/or analog circuits. The decoding device can be an autonomous unit, such as a hand-held user unit, or is built into a fax machine, scanner or similar apparatus.

It should be noted that the coding device and the decoding device can have means for executing each of the steps in the above-described coding and decoding methods. The means can consist, for example, of program codes for executing the different steps.

BRIEF DESCRIPTION OF THE DRAWINGS

The present invention will now be described by means of embodiments and with reference to the accompanying drawings, in which.

DESCRIPTION OF EMBODIMENTS

Figure 1:
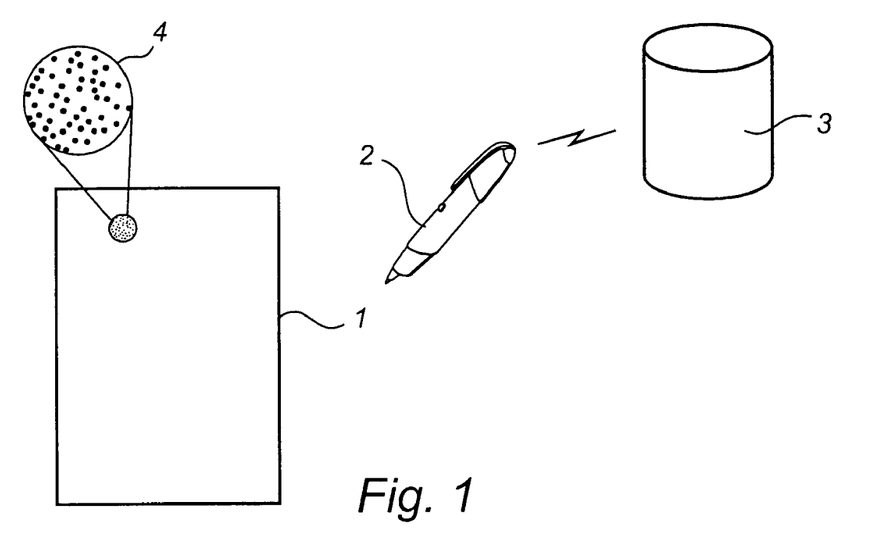
FIG. 1 shows schematically a system for information management, which system uses a coding pattern for controlling the information management.

FIG. 1 is a schematic representation of a system for information management in which the present invention can be used. The system comprises a base 1 in the form of a sheet of paper, a user unit 2 and an external unit 3. The paper is provided with a coding pattern 4 of which only a small part is indicated schematically in enlarged form. The user unit 2 can be used to write on the paper 1 and at the same time to record what is written in digital form. The digitally recorded information can be processed in the user unit 2 and/or the external unit 3 to which it can be sent automatically (on-line) or at a signal from the user.

Figure 2:
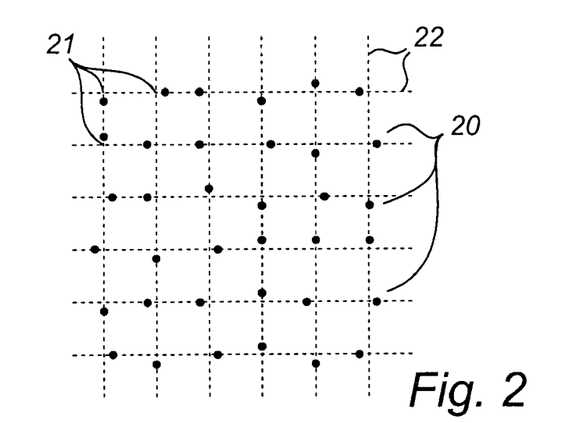
FIG. 2 shows an example of coding of a known position-coding pattern with the aid of only a first parameter.

The position information in the coding pattern 4 can be coded in the manner described in WO 01/26033. As is shown in FIG. 2, the position information is coded with the aid of marks 20 which in this case are in the form of dots. Each dot has a nominal position 21 which is set by the intersection between the lines 22 in a raster. The raster can be virtual, but it is shown here for the sake of clarity with the aid of broken lines. Each dot can be placed at one of four predetermined locations in relation to the nominal position, namely on a raster line above, to the right of, below, or to the left of the nominal position. Examples of these different locations are shown in FIG. 2. Depending on the location, the dot can for example code bit pairs (0,0; 0,1; 1,0; and 1,1). The location thus constitutes an example of a first parameter for coding of position information in a coding pattern.

Figure 3:
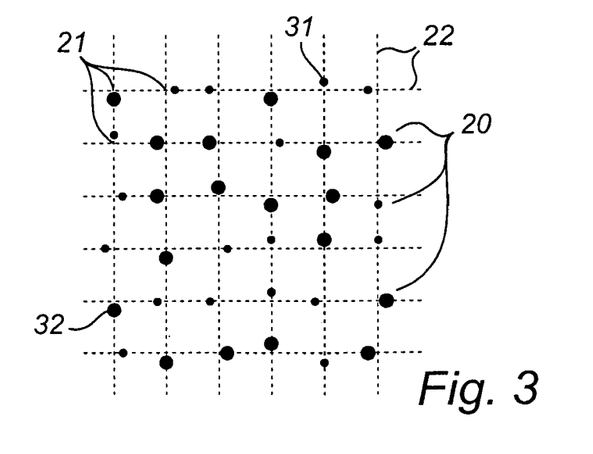
FIG. 3 shows an example of coding of a coding pattern with the aid of a first parameter and a second parameter.

In the coding pattern 4 in FIG. 1, further information in addition to the position information is coded. For the coding of the further information, a second parameter of the dots is used. FIG. 3 shows an example of this. Each dot now has, in addition to a location, also a predetermined size value. In this example, each dot either has the size value "large" (see for example the dot 32) or the size value "small" (see for example the dot 31). In this way, each dot can code $2^3$, i.e. 8, different values, which permits coding of a larger pattern than before, if the second parameter is used for position information.

In this example, however, the second parameter is used to code information other than position information. For this purpose, and for increasing the robustness of the coding, the coding pattern, as it is shown schematically in FIG. 4, has been divided into cells 40. The cells are normally not marked on the base on which the coding pattern is found and instead are virtual cells. For the sake of clarity, however, they are indicated in FIG. 4 by broken lines 41.

In this example, each cell contains four dots. Cells with another number of dots can of course be used. The cells do not have to be square, as in this example, and instead they can have other shapes, for example rectangular, triangular or hexagonal. The preferred shape can be influenced by the design of the raster for the dots. The cells do not all have to be the same size, if only their extent can be determined.

Figure 4:
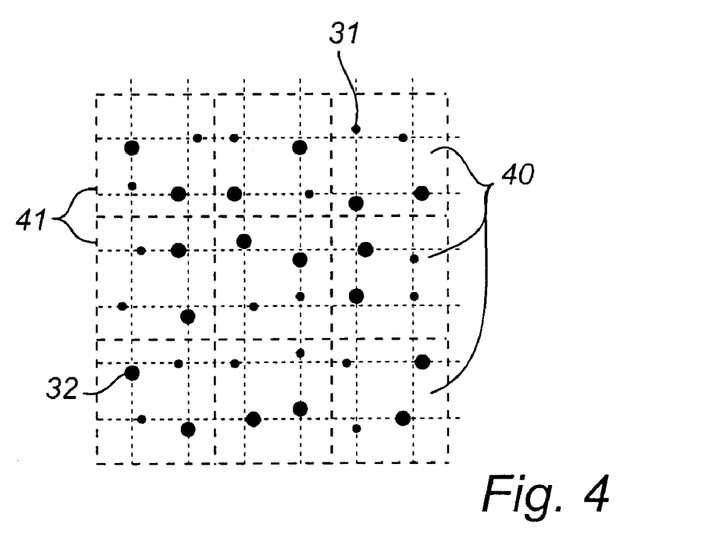
FIG. 4 shows the division, into cells, of a coding pattern of the same type as in FIG. 3.

As can be seen in FIG. 4, the cells also do not overlap one another, and instead they are fixed in relation to the pattern, which means that their location is easy to determine as soon as the position information in the coding pattern has been decoded. In this example, the coordinates of each point are coded with 6×6 dots. The coding is also "floating", which means that each partial area in the coding pattern which comprises 6×6 dots codes coordinates for a unique point. The coordinates are defined for the upper left dot in each 6×6 partial area. This fact can be used to determine the location of the cells. If the cells are placed starting in the upper left corner, which has the coordinates x=0 and y=0, on the total position-coding pattern, the upper left corner of each cell will have an even x-coordinate and an even y-coordinate, which can thus be used for determining the location of the cells on an arbitrary part of the coding pattern.

In order to increase the robustness of the coding, each cell in this example contains either only small dots or two large dots and two small dots. The two large dots can be chosen among the four dots in (4!/2!×2!))=6 different ways. With the aid of the second parameter, it is thus possible in this case to code 1+6=7 different cell values, in which case the cells with only small dots are preferably used to indicate "background". The other cell values can represent other forms of further inforamtion.

Now assume that a plurality of templates based on a continuous position-coding pattern are stored in digital form in the user unit 2 in FIG. 1. Each template can be defined with two coordinate pairs which define the extent of the page, for example the coordinate pairs for the upper left corner and the lower right corner of the page, and two coordinate pairs for each of the areas or fields which are defined on the page. In addition, each of the fields is provided with an indication concerning the field type or the field function, i.e. concerning how information recorded digitally from these fields is to be interpreted and/or processed.

Figure 5:
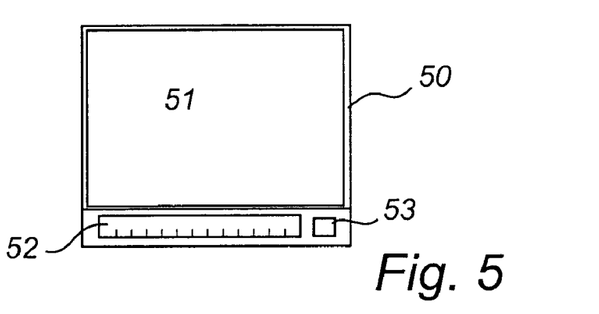
FIG. 5 shows an example of a page layout.

FIG. 5 shows an example of a physical page 50 which is intended to be used for sending an e-mail and which corresponds to a digital template stored in the user unit. On the page there is a field 51 which is intended for graphic information, for example a handwritten message. At the bottom of the page there is also a field 52 which is intended for address information which is to be interpreted by ICR (Intelligent Character Recognition). Finally, there is a field or a box 53 which is intended to be filled in by the user when he or she wishes to send the e-mail. Parts of the page outside the marked fields are not intended for recording of information. The whole page is provided with a continuous coding pattern (not shown).

A user can fill in relevant inforamtion on the page 50 since the different fields are marked on the page in a manner intelligible to the user. The inforamtion which is recorded digitally from the page with the aid of the user unit 2 consists of digital representations of partial areas of the coding pattern. If the coding pattern were only to contain position information, as is the case in FIG. 2, the digitally recorded information would not contain any information concerning from which field the inforamtion is recorded. Since the user unit contains the digital template, the user unit can however determine from which field the information is recorded and therefore how it is to be processed and/or interpreted.

Now assume, however, that a party wishes to have a layout with the address field 52 and the "send" box 53 at the top of the page instead of at the bottom, and that such a template is not pre-defined in the user unit 2. It is not then sufficient to change the layout on the physical page, and instead a corresponding digital template has to be found or created so that the user unit can interpret the digitally recorded information and process it in the correct way. If the layout is changed only on the physical page and the same position-coding pattern is used on this, the user unit will interpret the digitally recorded information with the aid of the template corresponding to FIG. 5. If the user then writes an e-mail address at the top of the page in the address field marked on the physical page, the user unit will only interpret the inforamtion as message information because, according to the template, the information comes from the message field 51. In the interpretation, it is therefore the digitally stored template which applies, and it may be difficult to change for a party wishing to have a layout other than those which are pre-defined.

A way of solving this problem is to define a plurality of alternative fields in one and the same digital template, for example one address field at the bottom of the page and one at the top of the page, and to use the further inforamtion which is coded in the coding pattern in FIG. 3 to mark whether a field is activated or not. On the physical page, fields which are to be activated are coded with a first cell value, and fields which are not to be activated with a second cell value. Alternatively, active fields can be coded with a first value of the second parameter, and inactive fields can be coded with a second value of the second parameter, for example all marks in an active field being made large in order to indicate that the field is active. As a further example, the values of the marks can vary in a predetermined manner in an active field, for example every other one large and every other one small, while all the marks in an inactive field have one and the same value.

A coding of the type described above can easily be created upon production of the physical page. In addition, the user unit needs only to be supplied with information on how active/inactive fields are coded.

An alternative solution to the above problem is to define different types of fields or areas from which recorded digital inforamtion is to be interpreted and/or processed in different ways. The different field types can be coded with the aid of different cell values. In the unit which is to process the digitally recorded information there need then only be a single template with a continuous position-coding pattern and a table of the meaning of the different cell values. A party wishing to create a physical page with its own layout can then "paint" the layout with the aid of the different cell values.

If the user unit 2 has a pen point and a sensor which are offset in relation to one another, then, as has already been mentioned, problems may arise in a boundary area between two fields or areas because the pen point points to a first field while the sensor records the coding pattern in a second field. The problem can be at least partially remedied if the cell values in the boundary area are coded in a specific way so that the processing unit can determine that the recorded coordinates originate from a boundary area and should therefore be processed in a special way.

One way of coding the boundary area is to mix cell values from the two adjacent fields in a check pattern. Another way is to allow the cell values to gradually shift from one field's cell value to the other field's cell value so that the processing unit can thereby determine where in the boundary area the coordinates have been recorded. Of course, it is possible to create more complicated layouts by mixing cells with two or more different cell values in a more advanced way.

Figure 6:
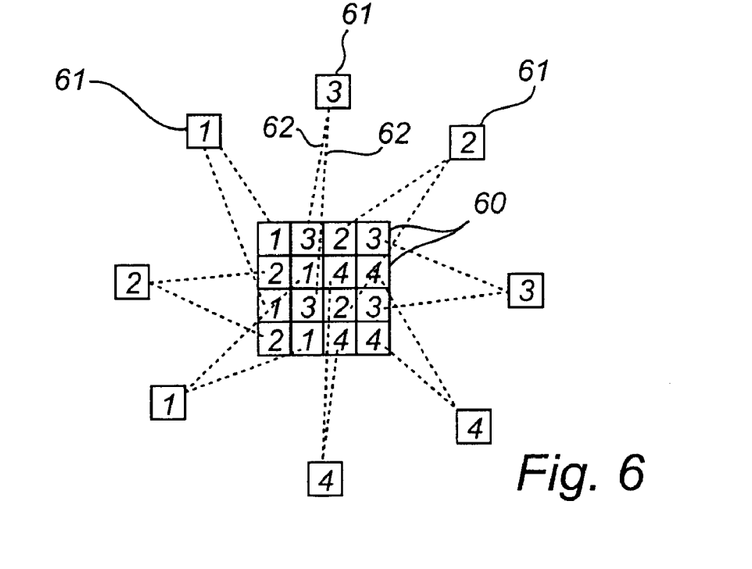
FIG. 6 shows schematically an example of coding of further information.

One example of a more advanced coding is shown in FIG. 6. Now assume that the sensor records 8×8 marks, that cells with 2×2 marks are used, and that the sensor sees 4×4 cells, as is shown at the center of FIG. 6, where the cells which the sensor sees are designated 60. In a boundary area, however, the further inforamtion located at the pen point is of more interest than the further information which the sensor sees. One can then let each of the cells within a 4×2 cell area code the cell value of a cell which is situated at the same distance from the sensor as the pen point in eight different directions. In FIG. 6, this is shown schematically with surrounding cells 61. The cell value of each cell 60 and 61 is marked in the cell, and broken lines 62 show related cells. It will therefore be understood that the eight topmost cells 60 and the eight bottommost cells 60 which the sensor in this case sees code the values of the surrounding eight cells 61. By decoding of the further information in the coding pattern which the sensor records, it is thus possible to determine the further information which is found in the coding pattern at the pen point for different rotations of the pen, whereby it is possible for example to determine whether the tip of the pen point situated in an active field or not.

The coding of the coding pattern can take place in a coding device, for example belonging to a party wishing to create a page with special layout for information management. An example of a coding device is shown schematically in FIG. 7. The coding device, which for example can be realized with a conventional personal computer, comprises a processor unit 70 which, in addition to the actual processor 71, comprises a working memory 72 and a program memory 73 which stores a program for creating the coding pattern. The coding device further comprises an input means 74, which makes it possible for a user to input information concerning the desired page layout into the processor unit. The input means 74 can for example be a keyboard or a mouse or some similar type of input unit normally used together with a computer. Also coupled to the coding device there may be a unit 75 which, on the basis of the digital representation of the coding pattern, applies the coding pattern onto a product. The unit can, for example, be a printer which prints out the coding pattern onto a sheet of paper or some form of printing device.

Figure 8:
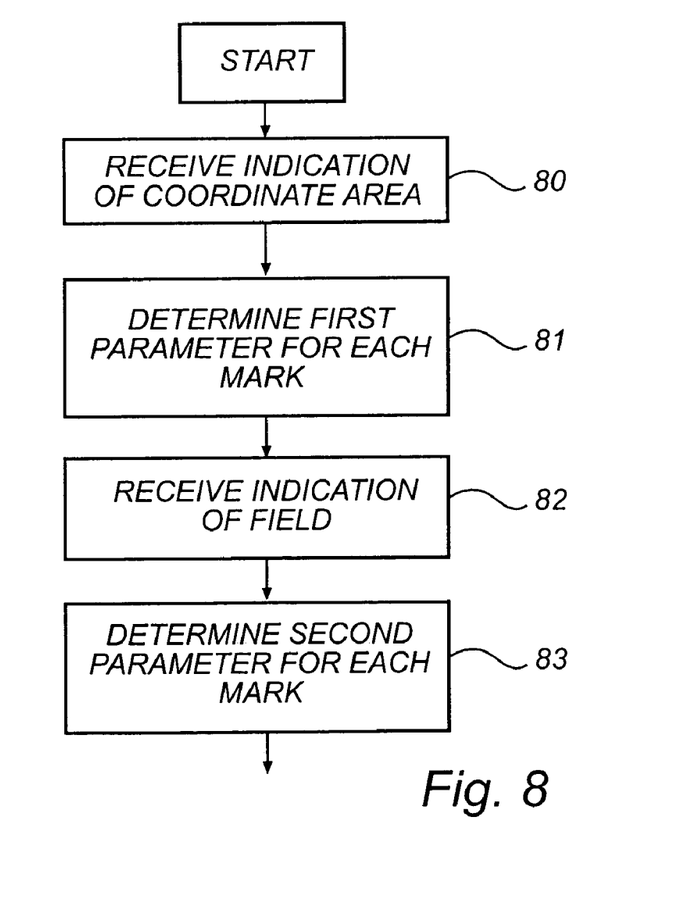
FIG. 8 is a flow chart and shows an example of how coding of a coding pattern can be carried out.

The way in which the coding proceeds is described below with reference to the flow chart in FIG. 8. This example relates to the case when the user creates a page layout by depicting areas on the page with the aid of the second parameter of the marks.

In a first step 80, the processor receives an indication concerning for which coordinate area coordinates are to be coded. The indication can come as a direct or processed input signal from the user. The extent of the coordinate area, i.e. of the page, can be defined with the aid of a coordinate pair which defines the upper left corner for the coordinate area, and a width and a height of the coordinate area. If these values are not stored in advance, they can be given directly by the user. In connection with this step, space in the working memory 72 is allocated for storing a digital representation of the coding pattern. For each mark included in the coding pattern, the processor thereafter calculates, in step 81, a value for a first parameter, which in this example is the location of the mark, according to a predetermined algorithm. The way in which such an algorithm can be built up is disclosed in above-mentioned WO 01/26033. The value for the first parameter for the respective mark is stored in a first matrix in the working memory 72. The value can for example be given as a number between 0 and 3, where 0 signifies that the mark is offset to the right from its nominal position, 1 that it is offset upwards, 2 that it is offset to the left, and 3 that it is offset downwards.

After this, the processor 71 receives an indication of the extent of at least one field which is to be marked out by using the second parameter, step 82. This indication can, for example, come in the form of a direct or processed input signal from the user, the field being described with the aid of a coordinate pair which defines the upper left corner for the field, the width and the height of the field calculated by number of cells, and the cell value or the cell values to be defined in the field. On the basis of the input signal, the processor determines a second matrix which defines the cell values for the whole coordinate area and which constitutes an input signal to the next step in the coding. In the following step, the processor also determines, on the basis of the second matrix and in accordance with a predetermined algorithm, a value for a second parameter for each of the marks, step 83, and stores these calculated values in the memory. More precisely, the processor determines a third matrix which has the same size as the first matrix, and it allocates to each mark the value zero or four, where zero indicates a small dot and four a large dot. The algorithm for calculating the value for the second parameter can be determined by a person skilled in the art on the basis of the above description of how the second parameter can be used. Finally, the first matrix and the third matrix are put together by the values at the same location being added so that a fourth matrix is formed where each element has a value between zero and seven. Each element corresponds to a mark in the pattern and defines its location and size in accordance with the following:

0=small dot, offset to the right
1=small dot, offset upwards
2=small dot, offset to the left
3=small dot, offset downwards
4=large dot, offset to the right
5=large dot, offset upwards
6=large dot, offset to the left
7=large dot, offset downwards.

Figure 7:
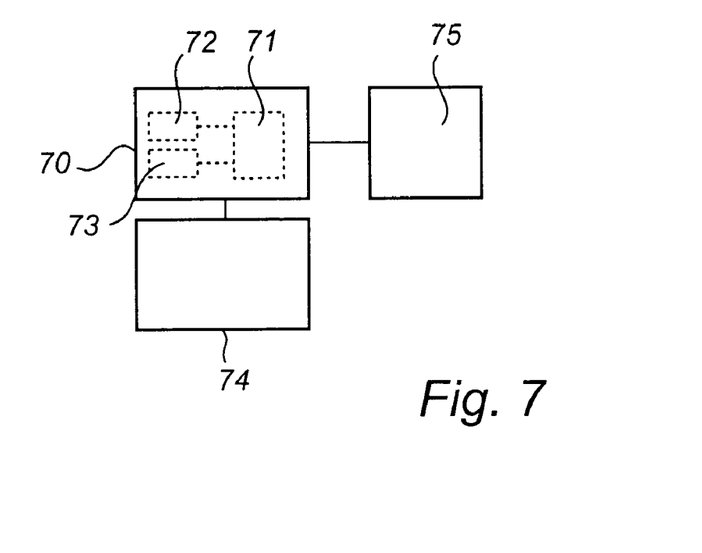
FIG. 7 shows schematically a coding device.

When the coding is finished, the coding pattern can, if so desired, be printed out on the printer 75. The fourth matrix may, for example, be sent to a program which generates a PostScript file for direct printout on a printer.

In an alternative coding embodiment, where one or more of a number of predefined fields in a template are to be activated, the user may select one of a plurality of templates which have a number of predefined fields. He may also indicate to the processor for which coordinate area coordinates are to be coded in the template. The extent of the coordinate area may be given by the template or indicated by the user. The user furthermore indicates which of the predefined fields is to be activated. By means of these inputs, the processor can code the coding pattern substantially as described above.

Figure 9:
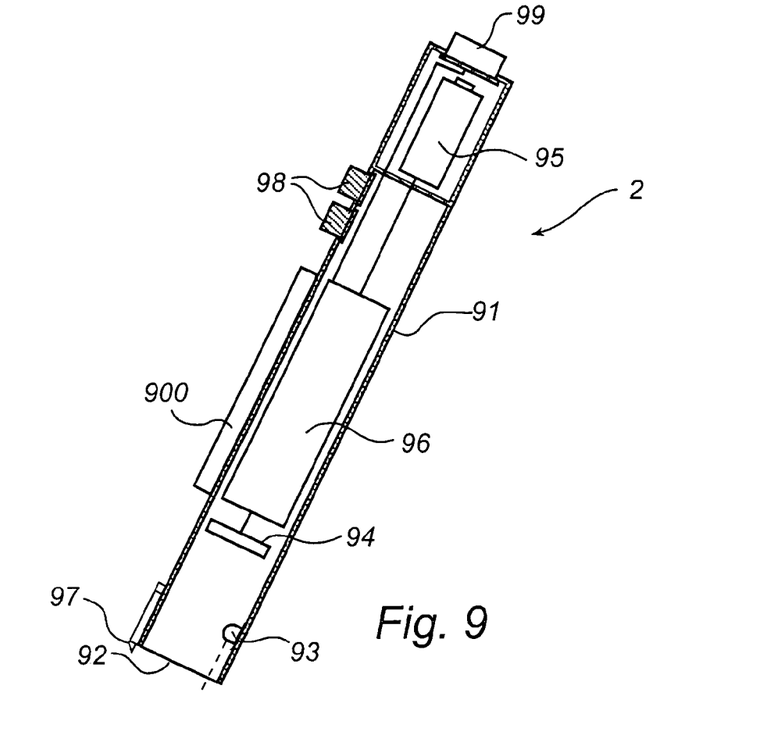
FIG. 9 is a schematic representation of a decoding device.

FIG. 9 shows an example of how it is possible to realize the user unit 2 in FIG. 1, which can be used as a decoding device. It comprises a casing 91 which is shaped approximately as a pen. In the short side of the casing there is an opening 92. The short side is intended to bear against or be held at a slight distance from the surface from which the coding pattern 4 is to be recorded.

The casing basically accommodates an optics part, an electronic circuitry part and a power supply.

The optics part comprises at least one light-emitting diode 93 for illuminating the surface which is to be images, and a light-sensitive area sensor 94, for example a CCD or CMOS sensor; for recording a two-dimensional image. Optionally, the device may additionally contain an optical system such as a mirror and/or lens system. The light-emitting diode may be an infrared light-emitting diode, and the sensor may be sensitive to infrared light.

The power supply for the device is obtained from a battery 95 which is mounted in a separate compartment in the casing. It is also conceivable to supply power via a cable from an external power source (not shown).

The electronic circuitry part comprises a processor unit 96 with a processor which is programmed to read images from the sensor and to decode the coding pattern in these images, and a working memory and program memory. The processor can also be programmed to execute certain operations on the basis of the decoded information. The processor can, for example, send information to a specific address included in the decoded information as a result of its interpreting and processing the decoded information. Alternatively, the processor can simply send the decoded information onwards to another unit, for example the external unit 3 in FIG. 1, for interpreting and processing of the information.

In this embodiment, the device further comprises a pen point 97 with which it is possible to write conventional ink-based writing on a base from which the coding pattern is to be recorded. The pen point 97 can be retractable and extendable so that the user can control whether it is to be used or not. In some applications, the device does not need to have a pen point at all.

The ink-based writing is suitably of such a type that it is transparent to infrared light and the marks absorb infrared light. By using a light-emitting diode which emits infrared light, and a sensor which is sensitive to infrared light, the detection of the pattern takes place without the above-mentioned writing interfering with the pattern.

The device may further comprise buttons 98 with which the device can be activated and controlled. It also has a transceiver 99 for wireless transmission, for example by IR light, radio waves or ultrasound, of information to and from the device. The device may further comprise a display 900 for showing the recorded and/or processed information.

The device may be divided into different physical casings, a first casing containing components which are necessary for recording images of the coding pattern and for transmitting these to components which are located in a second casing and which decode the coding pattern in the recorded image or images.

Figure 10:
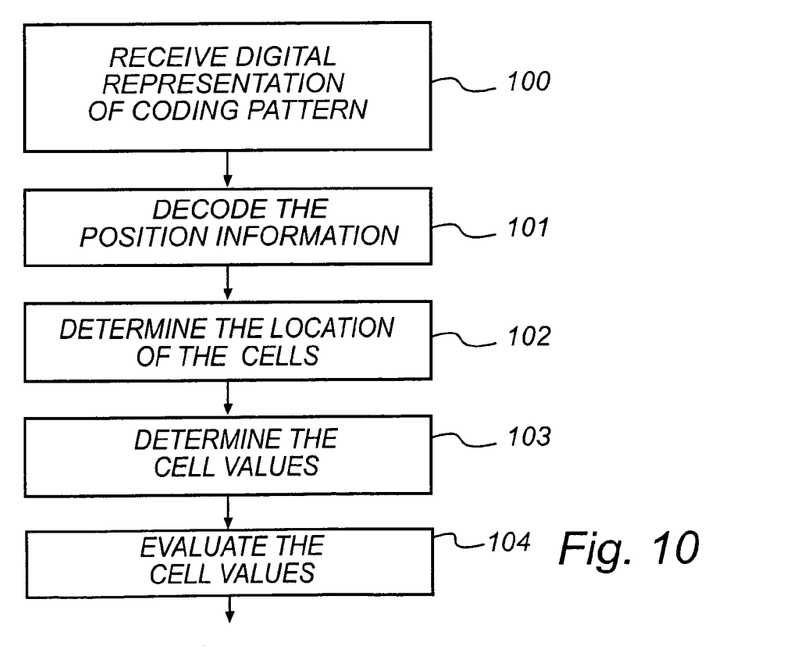
FIG. 10 is a flow chart and shows an example of how decoding of a coding pattern can be carried out.

An example of how the coding pattern can be decoded is now described below with reference to FIG. 10. In this example it is assumed that the decoding is carried out in a user unit. It can, however, also be carried out in an external unit.

In a first step 100, the processor 96 in the user unit 2 receives a digital representation of the coding pattern which the sensor 94 has recorded locally at the user unit end. Then, in step 101, the processor decodes the position information in the coding pattern by identifying the marks in the digital representation, determining the virtual raster and the location of the marks in relation to the virtual raster, and calculating coordinates for each point on the basis of the location of the marks in accordance with a predetermined algorithm. A more detailed description of how the position information can be decoded is given in WO 01/26033. It should be emphasized that the digital representation may include more marks than required for the decoding of the position information, which means that the processor need not use all the marks in the digital representation for decoding the position information.

When the position information has been decoded, the processor, in step 102, determines the location of the cells with the aid of the coordinates. Thereafter, the processor can determine the cell value of each cell by determining the size of the marks in the digital representation. Since it is given that each cell will contain two small and two large marks, or just four small marks, it is relatively easy for the processor to determine which marks are small and which are large, by comparing the sizes of the marks with one another within each cell. When the sizes of the different marks have been determined, the cell value is easy to determine, for example by using a table, step 103. Optionally, the processor can make an appraisal of how reliable the cell value is on the basis of how reliable the size determination is for the marks in the current cell.

The cell values can of course be determined in other ways. One alternative is to determine the size of each mark and, by comparing this with a predetermined or adaptively modifiable size distribution which reflects that the marks are recorded in different perspectives and with different lighting, to determine the probability of each mark being large or small. By multiplying together the probabilities of different combinations of small and large marks, the processor can determine the cell value which is most probable.

When the processor has determined the cell value for a desired number of the cells which are seen in the digital representation it has received, the processor can execute an evaluation step 104 in which the cell values for a plurality of cells are compared and any estimated or calculated probabilities for the cell values are corrected on the basis of the comparison. If the cells neighboring a particular cell have the same cell value as the particular cell, the processor can for example increase the estimated/calculated probability of the particular cell having this cell value. If, by contrast, a plurality of neighboring cells have a cell value different than that of the particular cell, this can lead to a reduction in the probability of the particular cell's cell value. In the evaluation step, amount can also be taken of any inforamtion on the distribution of the cell values between the cells.

When the processor has finally determined which cell value or cell values is/are coded by the coding pattern in the current digital representation of the coding pattern, the processor can either itself interpret and process the position information, i.e. the coordinates, on the basis of the decoded further information, i.e. the cell values, or it can send the decoded information to some other unit for interpretation and processing.

It should also be mentioned that the processor need not use all the marks in the digital representation when decoding the further information, because the digital representation may contain more marks than required for the decoding of the further information.

ALTERNATIVE EMBODIMENTS

In the above examples, a coding pattern is used in which the position information is coded using the location of the marks, and further information is coded using the size of the marks. Of course, both the position information and the further information can be coded using parameters other than those exemplified here. As an alternative, the shape of a mark can be used as a parameter. The marks can, for example, have different values on the basis of whether they are circular, triangular, rectangular, star-shaped, elliptic, hexagonal or of some other detectable shape. In order to be able to detect different shapes in different perspectives and different lighting, it may however be necessary to use a sensor with relatively high resolution. As a further alternative, the color of the mark can be used, so that the value of the mark depends on the color. However, for this purpose, a color sensor is required, or illumination with light of different wavelengths.

The principle of using a second parameter in order to code the further information can also be used for position-coding patterns of fundamentally different construction. For example, the position-coding pattern does not need to be floating.

In the examples described above, the marks are also in the form of circular dots. It is of course possible to use marks of different shape, for example triangular, square, elliptic, rectangular or hexagonal dots.

In the examples described above, all the cells have two large dots and two small dots or four small dots for coding of seven different cell values. It is of course possible to have smaller or larger cells with fewer or more cell values which are coded with other combinations of values of the second parameter.

In the example above, the further information is coded using a second parameter. However, it would also be possible to code the further information directly in the position inforamtion itself by coding the same position in two or more different ways depending on the value for the further information. This can be done in the following way, for example. The position-coding pattern in WO 01/26032 is based on a bit sequence which has the property that if a partial sequence with a predetermined number of bits is taken out of the bit sequence, this partial sequence has an unambiguously defined location in the bit sequence. This property applies also when the start and the end of the sequence are joined together, which sequence can thus be regarded as a ring. In coding of positions in the horizontal direction, for example, the bit sequences are written repeatedly in columns in a vertical direction. The bit sequences in different columns are written with different rotations, the columns thus being started at different locations in the bit sequence. The position coding in the horizontal direction is based on the differences between the locations in the bit sequence of partial sequences in the same vertical positions in a number of adjacent columns. The position coding in the vertical direction is done in a corresponding manner and is thus based on the differences between the locations in the bit sequence of partial sequences in the same horizontal positions in a number of adjacent rows. Since the position coding is described in WO 01/26032 and is not required for understanding how the further information is coded, it is not described in more detail here. Now assume now that a bit sequence is created which is made up of two ring-shaped sections which each have the above-mentioned property that, if a partial sequence of a predetermined length is taken out, its position in the ring-shaped section is unambiguously defined. Now further assume that these two ring-shaped sections have a partial sequence which is common and which thus couples the sections together to form an eight-shaped bit sequence. It is then possible to code some further information by defining that partial sequences belonging to the first section represent further information in the form of a first value, for example a zero, and partial sequences belonging to the second section represent further information in the form of a second value, for example a one. However, this means that fewer positions can be coded using the bit sequence because the partial sequences in the second section code the same positions in the bit sequence as the partial sequences in the first section. For example, when a field on a physical page with a position-coding pattern is to be coded as activated, i.e. with a first value for the further information, the bit sequences in the columns and rows are written in such a way that the first section of the bit sequence is repeated until the field which is to be activated is reached. A transition to the second section then takes place as soon as the writing of the bit sequence reaches the partial sequence which is common to the first section and the second section. Thereafter, the second section is repeated until the end of the field which is to be activated is reached, whereupon transition to the first section takes place as soon as the common partial sequence is reached. Since the bit sequences are written with different rotation in the different columns, the common partial sequence is not reached exactly at the same time in all columns. For this reason, the boundaries of the fields will be slightly uneven. To overcome this problem, however, it is possible to define that only the area which both in the horizontal direction and in the vertical direction is coded with the second section of the bit sequence defines an activated field. The decoding takes place in the manner described in WO 01/26032, but, when the position of a partial sequence in the bit sequence is to be determined, one also determines to which section of the bit sequence the partial sequence belongs and thus the value of the further information.

The coding and decoding can take place using the same means which have been described above in connection with coding and decoding of further information using a second parameter.

Instead of a bit sequence, a number sequence with another base can be used. Moreover, a plurality of loops or sections can be produced in the number sequence so that a plurality of values of the further information can be coded.

When this position-coding pattern is arranged on a product, a product is thus obtained which is provided with a position-coding pattern which codes coordinates for a plurality of points on the product on the basis of a number sequence which has the property that a partial sequence of the number sequence of a predetermined length has an unambiguously defined position in the number sequence, said number sequence having at least a first section and a second section which each have the above-mentioned property, and areas with a position-coding pattern on the product having different properties depending on whether they are coded with the first section or the second section of the number sequence.

We claim:

1. A product which is provided with a coding pattern, which codes position information in the form of coordinates for a plurality of points on the product utilizing a plurality of marks belonging to each point, the plurality of marks referencing a common raster, each mark of the plurality of marks having a first parameter which varies for coding of the position information, and each mark of the plurality of marks have a second parameter which varies for coding of further information in the coding pattern.

2. The product as claimed in claim 1, in which the second parameter is detectable independently of the first parameter.

3. The product as claimed in claim 1, in which the first parameter and the second parameter is one of the following pairs: location and size; location and color; size and location; size and shape; size and color; shape and location; shape and color; shape and size; color and location; color and size; and color and shape.

4. The product as claimed in claim 1, in which the further information is further position information.

5. The product as claimed in claim 1, in which the further information is information other than position information.

6. The product as claimed in claim 1, in which an area of the coding pattern is marked out utilizing the second parameter.

7. The product as claimed in claim 6, in which the area of the coding pattern is associated with a predetermined function.

8. The product as claimed in claim 1, in which the further information defines at least two different areas on the coding pattern.

9. The product as claimed in claim 8, in which the further information defines how coordinates which are recorded from said at least two different areas are to be processed.

10. The product as claimed in claim 1, in which the further information defines whether a predetermined area in the coding pattern is activated or not.

11. The product as claimed in claim 1, in which the coding pattern is divided into a plurality of cells, each of these comprising at least two marks, and in which the further information consists of a cell value which is coded by said at least two marks for each cell.

12. The product as claimed in claim 11, in which the cells comprise fewer marks than said plurality of marks belonging to each point.

13. The product as claimed in claim 11, in which each mark has one of at least two predetermined values for the second parameter, and in which each cell comprises at least one mark with a first value of said at least two predetermined values and at least one mark with a second of said at least two predetermined parameters.

14. The product as claimed in claim 11, in which the coding pattern comprises a first area and a second area, and in which the cells in the first area have a first cell value and the cells in the second area have a second cell value.

15. The product as claimed in claim 14, in which a boundary area between the first area and the second area comprises cells with the first cell value and cells with the second cell value.

16. The product of claim 11, wherein the cells are non-overlapping or at least some of the plurality of marks may code both position information and further information utilizing the first and second parameter, respectively.

17. The product of claim 1, wherein the raster is a virtual raster.

18. A method in a coding device for coding of a coding pattern which codes position information in the form of coordinates for a plurality of points utilizing a plurality of marks belonging to each point, the plurality of marks referencing a common raster, comprising allocating, for the coding of the position information, to each mark of the plurality of marks one of at least two predetermined values for a first parameter, wherein each mark of the plurality of marks is allocated one of at least two predetermined values for a second parameter for coding of further information in the coding pattern.

19. A method as claimed in claim 18, in which the second parameter, which is allocated to said each mark, is detectable independently of the first parameter.

20. The method as claimed in claim 19, in which the first parameter and the second parameter are one of the following pairs: location and size; location and color; size and location; size and shape; size and color; shape and location; shape and color; shape and size; color and location; color and size; and color and shape.

21. The method as claimed in claim 18, comprising allocating to marks, which belong to points within an area of the coding pattern, values for the second parameter, wherein, based on the marks, the limits of said area in the coding patterns may be detected.

22. The method as claimed in claim 21, in which the allocation to marks of values for the second parameter is carried out depending on how coordinates recorded from said area of the coding pattern is to be processed.

23. The method as claimed in claim 18, comprising marking a predetermined area of the coding pattern as activated, by allocating to marks which belong to points within the predetermined area a predetermined value for the second parameter.

24. The method as claimed in claim 18, further comprising dividing the coding pattern into cells, each of these comprising at least two marks, and allocating to each cell a cell value which constitutes the further information, the allocation to each mark of one of at least two predetermined values for the second parameter taking place dependent on the cell value.

25. The method as claimed in claim 24, in which the marks within each cell are allocated values for the second parameter so that each cell contains at least one mark with each of the predetermined values for the second parameter.

26. The method of claim 24, wherein the cells are non-overlapping or at least some of the plurality of marks may code both position information and further information utilizing the first and second parameter, respectively.

27. The method as claimed in claim 18, further comprising creating a product with a coding pattern, by applying the coding pattern with marks which have the allocated values for the first parameter and the second parameter, on a product.

28. A computer readable-medium for storing instructions, executed by a processor, for performing the method according to claim 18.

29. The method as claimed in claim 28, further comprising dividing, based on the position information, the digital representation of the coding pattern into cells and determining a cell value for each cell on the basis of the value of the second parameter for the marks of the cell.

30. The method as claimed in claim 29, further comprising processing the position information dependent on the cell values for corresponding cells.

31. The method of claim 29, wherein the cells are non-overlapping or at least some of the plurality of marks may code both position information and further information utilizing the first and second parameter, respectively.

32. The method of claim 18, wherein the raster is a virtual raster.

33. A device for coding of a coding pattern, which codes position information in the form of coordinates for a plurality of points utilizing a plurality of marks belonging to each point, the plurality of marks referencing a common raster, comprising:
a processor for determining a value for a first parameter and a value for a second parameter for each mark of the plurality of marks, and a memory for storing the values of each mark of the plurality of marks for the first parameter and the second parameter.

34. A method for decoding, in a decoding device, of a coding pattern which codes position information in the form of coordinates for a plurality of points on a product utilizing a plurality of marks belonging to each point, the plurality of marks referencing a common raster, comprising receiving a digital representation of the coding pattern, decoding the position information utilizing a value for the first parameter for at least some of the marks of the plurality of marks in the digital representation, wherein further information is decoded from the coding pattern on the basis of the value for a second parameter for at least some of the marks of the plurality of marks in the digital representation.

35. The method as claimed in claim 34, in which the decoding of the position information and the decoding of further information is made independently of each other.

36. The method as claimed in claim 34, in which the first parameter and the second parameter is one of the following pairs: location and size; location and color; size and location; size and shape; size and color; shape and location; shape and color; shape and size; color and location; color and size; and color and shape.

37. The method as claimed in claim 34, further comprising determining how coordinates which have been recorded from the coding pattern are to be processed based on the value of the second parameter for at least some of the marks in the digital representation.

38. The method as claimed in claim 34, further comprising determining whether a pre-defined area in the coding pattern is activated or not based on the value of the second parameter for marks which belong to points in the area.

39. A computer readable medium for storing instructions, executed by a processor, to perform the method according to claim 34.

40. A device for decoding of a coding pattern which codes position information in the form of coordinates for a plurality of points on a product utilizing a plurality of marks belonging to each point, the plurality of marks referencing a common raster, which device comprises a processor which is arranged to receive a digital representation of the coding pattern, to decode the position information with the aid of the value for the first parameter for at least some of the marks of the plurality of marks in the digital representation, wherein the processor is also arranged to decode further inforamtion from the coding pattern based on the value for a second parameter for at least some of the marks of the plurality of marks in the digital representation.

41. A product with a coding pattern which codes coordinates for a plurality of points on the product through variation of a first parameter of a plurality of marks belonging to each point, all marks on the product referencing a common raster; which coding pattern is used for digital recording of information which is written on the coding pattern; and which coding pattern comprises at least a first area and a second area; said information which is recorded digitally being processed in different ways depending on from which of said areas the information is recorded, and the first area and the second area being coded in the coding pattern through variation of a second parameter of marks of the first and second area.

42. A product which is provided with a position-coding pattern which codes coordinates for a plurality of points on the product based on a number sequence which has the property that a partial sequence of the number sequence of a predetermined length has an unambiguously defined position in the number sequence, said number sequence having at least a first section and a second section which each have the property and areas with a position-coding pattern on the product having different properties depending on whether they are coded with the first section or the second section of the number sequence.

\* \* \* \* \*